Figures 1, 2:
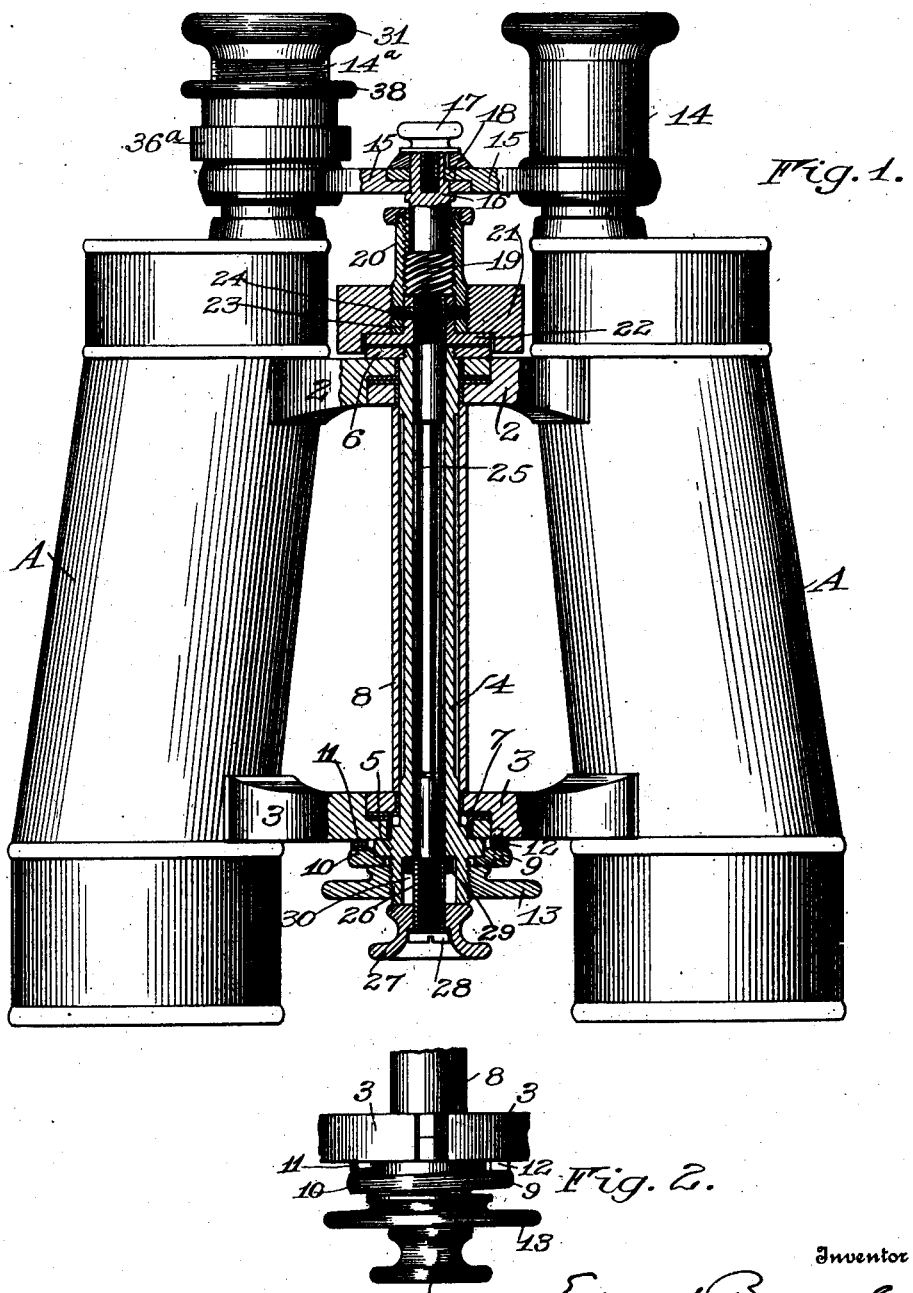

E. BAUSCH.
BINOCULAR TELESCOPE.
APPLICATION FILED APR. 25, 1907.

905,979.

Patented Dec. 8, 1908.

2 SHEETS—SHEET 1.

Witnesses
Walter B. Payne
H. H. ——

Inventor
Edward Bausch
By Church & Rich
His Attorneys

E. BAUSCH.
BINOCULAR TELESCOPE.
APPLICATION FILED APR. 25, 1907.
905,979.
Patented Dec. 8, 1908.
2 SHEETS—SHEET 2.
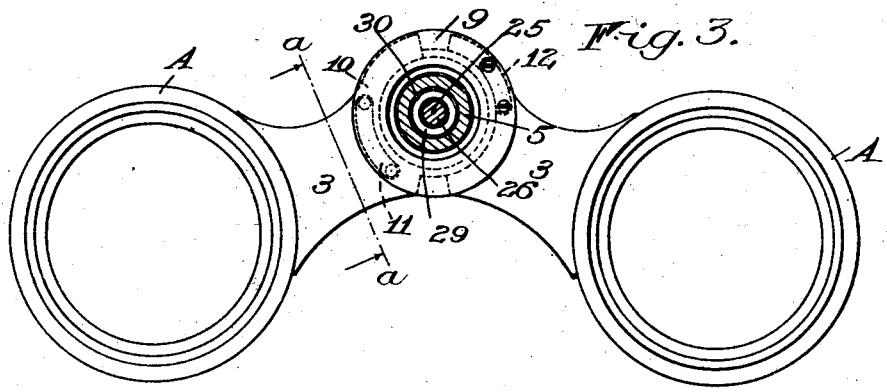
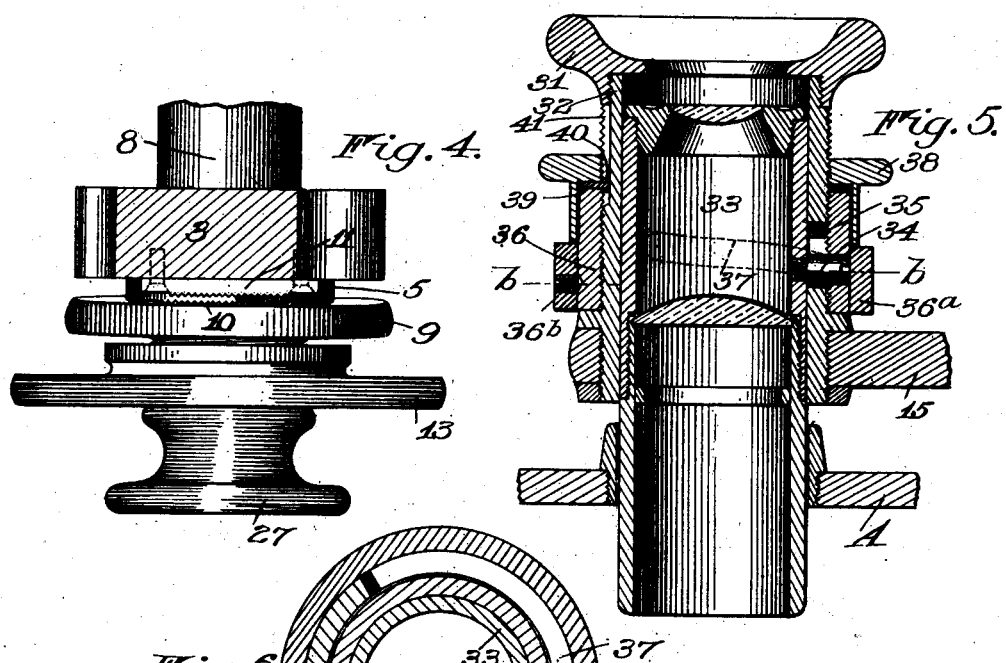
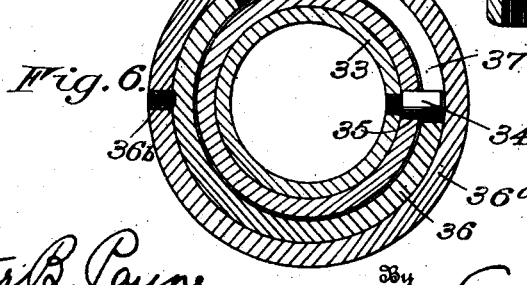

UNITED STATES PATENT OFFICE.

EDWARD BAUSCH, OF ROCHESTER, NEW YORK, ASSIGNOR, BY MESNE ASSIGNMENTS, TO BAUSCH & LOMB OPTICAL COMPANY, (NO. 2,) A CORPORATION OF NEW YORK.

BINOCULAR TELESCOPE.

No. 905,979.      Specification of Letters Patent.      Patented Dec. 8, 1908.

Application filed April 25, 1907. Serial No. 370,198.

*To all whom it may concern:*

Be it known that I, EDWARD BAUSCH, of Rochester, in the county of Monroe and State of New York, have invented new and useful Improvements in Binocular Telescopes; and I do hereby declare the following to be a full, clear, and exact description of the same, reference being had to the accompanying drawings, forming a part of the specification, and to the reference-numerals marked thereon.

This invention relates to binocular telescopes and more particularly to adjusting mechanisms therefor; one object of the invention being to provide a simple and effective means for locking the barrels in the various positions to which they may be adjusted to obtain different pupilary distances; another object being to provide means for locking the focal-adjusting mechanism against movement, whereby a certain focal adjustment cannot be accidentally disturbed in the handling of the telescope; and a further object being to provide a means for giving one of the eye pieces a secondary focal-adjustment without rotating the eye piece and without adjusting the eye cap, as is usually done in making this focal-adjustment.

With these and still other ends in view, the invention consists of the parts and the combinations of parts shown in the drawings hereto annexed, hereinafter described and more particularly pointed out in the appended claims.

In the drawings; Figure 1, is a view showing in longitudinal section the main focal adjusting mechanism and the lock for the pupilary adjusting mechanism, the other parts of the telescope being shown in elevation. Fig. 2, is a detail view showing in elevation the lock for the pupilary adjusting mechanism. Fig. 3, is a bottom view of the telescope showing the aforesaid lock in dotted lines. Fig. 4, is an enlarged detail sectional view on line *a—a* Fig. 3. Fig. 5, is a longitudinal section through the adjustable eye piece, and Fig. 6, is a section on line *b—b*, Fig. 5.

With more particular reference to the drawings; A indicates the objective casings which may be constructed in any suitable manner. These casings have a hinged connection with each other to permit their relative adjustment for the purpose of varying the pupilary distance. As a preferred manner of hinging the objectives, there is provided on each casing a pair of arms 2 and 3 which are, if desired, formed at their free ends so that, when assembled with the arms of the other casing, a flush joint is provided. Connecting the two joints is a tubular or hollow bolt 4 which passes through perforations in the ends of the arms, and is held in position by a head 5 at one end and a disk-shaped nut 6 which engages the other and threaded end. The walls of the perforations through the hinge arms are lined with a hard metal 7 to prevent undue wear of the arms, which, together with the outer wall of the objective casings, are preferably made of aluminum. To prevent dust reaching these bearings and at the same time to hold the joints in spaced relation, the bolt is surrounded by a sleeve 8.

As a means for locking the objective casings against movement on their hinged connection, there is carried by an arm of one casing, a locking member 9, preferably in the form of a ring having an arcuate serrated locking face 10 concentric to the pivotal axis of the hinged connection. The face is arranged concentrically to the aforesaid axis so that when an arcuate locking projection 11 on the adjacent arm of the other objective casing is moved with said arm, said projection will be in position at all times to properly engage the face on the locking member 9.

The locking member 9 is preferably made of spring material and normally tends to move to unlocking position, being for this purpose mounted upon a beveled block 12 secured to a hinge arm of one of the objective casings. To move the locking member to and hold it in locking position, there is provided a lock nut 13 which has threaded engagement with threads on the headed end 5 of bolt 4.

The eyepiece casings 14 and 14ª have a hinged connection to permit them to move with the objective-casings for the pupilary adjustment. As a means for forming this connection, two arms 15 are extended from the eyepiece casings 14 and 14ª and have their free ends formed so that they will lie flush when connected by a pivot pin 16 which passes through perforations in the arms and is held in said perforations by a headed screw 17. So as to prevent the pivot pin turning, one of the arms is provided with a lip 18 which extends into a longitudinal groove in the pivot pin.

The focal adjustment of the telescope is obtained as usual, by moving the eyepiece longitudinally of the objective casings. The means for accomplishing this comprises a screw member 19 which, in this instance, is externally threaded and projects from the pivot pin 16 and is non-rotatable owing to the fact that the pivot pin is held against rotation by the lip 18. Working on the non-rotatable screw 19 is a rotatable screw member 20 which, in the present instance, is in the form of an internally threaded sleeve, having one end externally screw threaded to receive a thumb wheel 21.

To prevent the focal adjustment being accidentally disturbed, the rotatable screw member carries a frictional locking face, preferably in the form of a disk 22 having a central hollow boss 23 fitted in one end of the sleeve 20 and held against movement in said sleeve, as for instance, by a series of screws 24 passing radially through the sleeve into the boss 23. This locking face is adapted to engage a frictional locking face on the disk-shaped nut 6 carried by the objective casings, the rotatable screw member, for this purpose, being mounted to move axially. The means for moving said rotatable screw member axially and at the same time for holding said locking faces in contact, comprises a spindle 25 which is arranged within the tubular bolt 4, at one end has screw threaded engagement with the inner wall of the boss 23 and at the other has a screw thread 26 engaged by a thumb nut 27 adapted to bear against the headed end 5 of the bolt 4. Nut 27 is held to the spindle by a headed screw 28 and the movement of the spindle, when loose, is limited both by the headed screw and by a nut 29 arranged within a depression 30 in the headed end of the bolt 4. The other end of the spindle is prevented from turning in the boss 23, by the radial screws 24.

The secondary focal adjustment, that is, the adjustment for persons having eyes of different strength, is obtained, as usual, by adjusting one eyepiece relatively to its objective and to the other eyepiece. In previous constructions it has been common when adjusting this eyepiece, to adjust the cap which bears around the eye and to rotate the eyepiece. The adjustment of the cap causes the instrument to be positioned unevenly, while the rotation of the eyepiece during sighting, is objectionable.

In the present invention the eyepiece casing of the adjustable eyepiece is secured to the hinge arm in any suitable manner and has the cap 31 rigidly secured thereto, as by means of the reduced screw threaded end 32 of the casing. The eyepiece carrier 33 projects into the objective casing and is in the form of a divided tube movable longitudinally within the casing and held against turning by a projection 34 which works in a longitudinal slot 35 in the casing. To move the carrier, the eyepiece casing is surrounded by a cam ring 36 which is formed on its inner wall with a spiral cam-groove 37 receiving the free end of the projection 34, it being apparent that, when the cam ring is rotated, the eyepiece carrier will move longitudinally.

To prevent dust passing between the wall of the cam-ring and the wall of the eyepiece casing and into the casing through the slot 35, the cam ring has a screw threaded connection with the outer wall of the casing, these screw threads being of such low pitch that the cam ring when rotated will move longitudinally a very small distance only. So that the cam ring may be easily turned, it is provided with a peripheral projection in the form of a hard rubber ring $36^a$ which closes the cam-groove to the outside and is secured to the cam ring, as for instance, by a screw $36^b$. A lock nut 38 for the cam ring surrounds the casing and has a tubular extension to house a portion of said ring, and to prevent the cam ring loosening the lock nut, a washer 39 is interposed between said parts and has a tongue 40 projecting into a longitudinal groove 41 in the casing to prevent turning of the washer.

It will be apparent that the adjustments herein described, perfectly exclude dust, are simple and effective in operation, and, while giving all necessary adjustments of a binocular telescope, are compactly arranged.

Having thus described my invention, what I claim is:

1. In a binocular telescope, the combination with a pair of casings, and hinged connection between the casings, permitting a relative adjustment of the casings for the pupilary distance, of means for locking said parts in any of their adjusted positions, comprising a pair of locking members each turning with one of the casings, and one being movable both relatively to its casing and also toward and from the other and having a serrated locking face arranged concentrically to the pivotal axis of hinged connection.

2. In a binocular telescope, the combination with a pair of casings, and hinged connection between the casings, permitting a relative adjustment of the casings for the pupilary distance, of means for locking said parts in any of their adjusted positions, comprising a locking member carried by one of said casings, adapted to move into connection with the other casing but normally tending to move out of connection therewith, and means for holding said member in locking position.

3. In a binocular telescope, the combination with a pair of casings, and hinged connection between the casings, permitting a relative adjustment of the casings for the pupilary distance, of means for locking said parts in any of their adjusted positions, comprising a locking ring carried by one of said casings, formed of spring material and normally tending to move to unlocking position a device for coöperating with the locking ring, and means for holding said ring in locking position.

4. In a binocular telescope, the combination with a pair of casings, and hinged connection between the casings, permitting a relative adjustment of the casings for the pupilary distance, of means for locking said parts in any of their adjusted positions, comprising a locking member normally tending to move to unlocking position and having a serrated locking face arranged concentrically to the pivotal axis of the hinged connection a device for coöperating with the serrated locking member, and means holding said serrated member in locking position.

5. In a binocular telescope, the combination with a pair of casings, of a hinged connection between the casings, permitting a relative adjustment of the casings for the pupilary distance, and embodying a bolt, of locking means for holding the parts in their adjusted positions, comprising a locking ring carried by one casing, adapted for connection with the other casing, surrounding the bolt, and having a serrated locking face.

6. In a binocular telescope, the combination with a pair of casings, of a hinged connection between the casings, permitting a relative adjustment of the casings for the pupilary distance, and embodying a bolt, of locking means for holding the parts in their adjusted positions, comprising a locking ring carried by one casing, adapted for connection with the other casing, surrounding the bolt, and normally tending to move out of locking connection with the other casing, and means for holding said ring in locking position.

7. In a binocular telescope, the combination with a pair of casings, of a hinged connection between the casings, permitting a relative adjustment of the casings for the pupilary distance and embodying a bolt, of locking means for holding the parts in their adjusted positions, comprising a spring locking ring carried by one casing, adapted for connection with the other casing, surrounding the bolt and normally tending to move to one position, and means moving said ring to the other position.

8. In a binocular telescope, the combination with a pair of objective casings, and eyepiece casings adjustable on said first named casings, for the focal adjustment of the telescope, of means for adjusting said eyepiece casings on the objective casings, comprising a non-rotatable member carried by the eyepiece casings, a coöperating rotatable screw member carried by the objective casings and movable axially into interlocking connection with said casings and a device for moving the rotatable screw into interlocking connection with the objective casing.

9. In a binocular telescope, the combination with a pair of objective casings, eyepiece casings adjustable on said objective casings for the focal adjustment of the telescope, and a hinged connection between the objective casings, embodying a tubular bolt, of means for adjusting the eyepiece casings on the objective casings, comprising a non-rotatable screw member carried by the eyepiece casings, and a coöperating axially movable, rotatable screw member carried by the objective casings, having a spindle extending entirely through the tubular bolt, and an exposed lock-nut upon the end of the spindle to hold the rotatable screw member against axial movement.

10. In a binocular telescope, the combination with a pair of objective casings, a pair of eyepiece casings adjustable on the objective casings for the focal adjustment of the telescope, and a hinged connection between the objective casings, embodying a tubular bolt, of a locking face carried by the eyepiece casings, and means for adjusting the eyepiece casings, comprising a non-rotatable screw member carried by the eyepiece casings, and a coöperating axially movable, rotatable screw member carried by the objective casings and having a locking face adapted to contact with the locking face carried by the objective casings, a spindle extending through the tubular bolt, and a lock nut upon the end of the spindle to hold the locking face on the rotatable screw member against the locking face carried by the objective casings.

11. In a binocular telescope, the combination with a pair of objective casings, eyepiece casings adjustable on the objective casings for the focal adjustment of the telescope, and a hinged connection between the objective casings, embodying a tubular bolt, of means for adjusting the eyepiece casings on the objective casings, comprising a non-rotating screw carried by the eyepiece casings, and a coöperating rotatable, axially movable screw, having a spindle extending entirely through the tubular bolt, and exposed means on the end of the spindle for moving the rotatable screw axially into connection with the objective casings to hold the screw against rotation.

12. In a binocular telescope, the combination with a pair of objective casings, eyepiece casings adjustable on the objective casings for the focal adjustment of the telescope, and a hinged connection between the objective casings, embodying a tubular bolt, of means for adjusting the eyepiece casings on the objective casings, comprising a nonrotating screw member carried by the eyepiece casings, and a coöperating rotatable, axially movable screw member comprising an internally threaded sleeve, a thumb wheel on the sleeve, a disk having a central hollow boss fitted in the end of the sleeve, a spindle fitted in the boss and extending through the tubular bolt, screws passing radially through the sleeve and the boss and engaging the spindle, and a nut on the spindle for holding the rotating member against movement.

13. In a binocular telescope, a pair of objective casings, a pair of eyepiece casings, one of which carries a cap piece and has an eyepiece carrier adjustable in the direction of its optical axis relatively to the cap piece; and means for simultaneously adjusting the eyepiece casings.

14. In a binocular telescope, a pair of objective casings, a pair of eyepiece casings, an eyepiece carrier in one of the casings independently adjustable relatively to its cap, and means for adjusting said carrier comprising a projection extending from the carrier and a cam ring engaging said projection.

15. In a telescope, an eyepiece casing carrying a cap and provided with a longitudinal slot, an eyepiece carrier having a projection extending through the slot, and a cam ring engaging the projection and moving the carrier in the casing.

16. In a binocular telescope, a pair of objective casings, a pair of eyepiece casings, an eye piece carrier for one of the eye piece casings adjustable independently of the latter, and a ring for adjusting said carrier, having screw threaded connection with its casing.

17. In a binocular telescope, a pair of objective casings, a pair of eye piece casings, each of which has a cap and is adjustable relatively to its objective casing, an eye piece carrier for one of said eye piece casings independently adjustable therein relatively to its cap, means preventing the turning of said carrier in its casing and means for adjusting said carrier longitudinally of its casing.

18. In a binocular telescope, a pair of objective casings, a pair of eyepiece casings, one of which has an eyepiece carrier independently adjustable therein, a ring surrounding the latter casing and having connection with the carrier to adjust the latter in its casing, a lock nut for the ring, and a washer having an interlocking connection with said casing and interposed between the lock-nut and the ring.

EDWARD BAUSCH.

Witnesses:
  C. M. WAGNER,
  W. G. WOODWORTH.